(12) United States Patent
Custard

(10) Patent No.: US 8,979,022 B2
(45) Date of Patent: Mar. 17, 2015

(54) ATTACHMENT BRACKET FOR LANDING GEAR

(71) Applicant: Michael Lee Custard, Bend, OR (US)

(72) Inventor: Michael Lee Custard, Bend, OR (US)

( * ) Notice: Subject to any disclaimer, the term of this patent is extended or adjusted under 35 U.S.C. 154(b) by 281 days.

(21) Appl. No.: 13/679,464

(22) Filed: Nov. 16, 2012

(65) Prior Publication Data

US 2014/0021296 A1    Jan. 23, 2014

Related U.S. Application Data

(60) Provisional application No. 61/674,484, filed on Jul. 23, 2012.

(51) Int. Cl.
*B64C 25/52* (2006.01)
*B64C 25/00* (2006.01)
*B64C 25/66* (2006.01)
*B64C 25/54* (2006.01)

(52) U.S. Cl.
CPC ............... *B64C 25/001* (2013.01); *B64C 25/52* (2013.01); *B64C 25/54* (2013.01); *B64C 25/66* (2013.01)
USPC .................................................... 244/100 R

(58) Field of Classification Search
USPC .................................................... 244/100 R
See application file for complete search history.

(56) References Cited

U.S. PATENT DOCUMENTS

| 2,733,026 A * | 1/1956 | Ditter ............................ 244/108 |
| 2,977,073 A * | 3/1961 | Ditter et al. ................... 244/108 |
| 7,055,779 B1 * | 6/2006 | Discher ......................... 244/108 |
| 7,500,678 B1 * | 3/2009 | Whiting .......................... 280/9 |

OTHER PUBLICATIONS

Turbulence Skis, http://www.turbulence.ca/an/skisan.html#PENETRATION, pp. 1-16.
Airglas, Inc., 3500 O"Malley Road, Anchorage, Alaska, 99507, http://www.airglas.com, p. 1.
Hitchcock Aviation, LW-3600 Fixed Penetration Ski, Airglas Skis, http://hitchcockaviation.com/detail.php?item=5 &cat=Airglas%20Skis, p. 1.
Datum Inc., Nose Ski 1000, http://www.datumair.com/products-info.php?id=nose-1000, p. 1.
Burl's Aircraft, LLC., http://www.burlac.com/Tailski.html, p. 1.

* cited by examiner

*Primary Examiner* — Isam Alsomiri
*Assistant Examiner* — Justin Benedik
(74) *Attorney, Agent, or Firm* — Leber Patent Law P.C.

(57) ABSTRACT

Attachment brackets are disclosed which are configured to be removably mounted on aircraft landing gear, e.g., by bolting the bracket to the landing gear. The attachment brackets may be used to secure skis, pontoons, or other landing equipment to the landing gear of the aircraft. In preferred implementations, the brackets are bolted on using existing factory drilled holes in the landing gear.

16 Claims, 7 Drawing Sheets

ATTACHMENT BRACKET FOR LANDING GEAR

BACKGROUND

Skis are generally attached to aircraft landing gear by a welding an attachment bracket to the landing gear. Aircraft landing gear are made with heat treated, tempered alloy steel, and thus welding of the attachment bracket to the landing gear can compromise the steel due to the intense high temperatures generated by the welding process.

Attaching such brackets requires the installer to perfectly align the bracket, secure the bracket during the welding process and to protect the aircraft itself from the hazards of the welding process. The hazards of the welding process include an extremely high heat source, sparks, and an electrical current on an aircraft containing highly volatile fuel.

SUMMARY

In general, the present invention features attachment brackets which are configured to be removably mounted on aircraft landing gear, e.g., by bolting the bracket to the landing gear. The attachment brackets may be used to secure skis, pontoons, or other landing equipment to the landing gear of the aircraft. In preferred implementations, the brackets are bolted on using existing factory drilled holes in the landing gear.

Aircraft landing gear are built in alignment with the aircraft fuselage to maintain proper tracking, and thus by utilizing the existing factory drilled holes in the landing gear, the attachment bracket aligns itself with the landing gear which then aligns correctly with the aircraft. This method of attachment minimizes or eliminates the margin for error in the attachment bracket installation process and eliminates the hazards associated with welding.

Moreover, the attachment bracket, when not in use or not needed again, can easily be removed leaving no trace of installation or usage on the landing gear. This can be useful, for example, when the aircraft is being sold. The removability of the bracket is also advantageous when the landing gear is damaged, as it allows the bracket to be easily removed and installed on a new landing gear. For example, if during landing in a remote location a stump just under the snow breaks the landing gear another pilot can fly in new landing gear and with the use of a few hand tools the damaged plane can be operational again.

In one aspect, the invention features a device comprising a rigid member having a first portion configured to be removably attached to the landing gear of an aircraft, and a second portion configured to allow a piece of landing equipment to be removably mounted on the rigid member.

Some implementations include one or more of the following features. The first portion can include at least one bracket element configured to be bolted to the landing gear. In some cases, the first portion includes a pair of bracket elements, disposed such that bolts extending through the bracket elements are generally perpendicular to each other. For example, one of the brackets may be configured to be bolted to a suspension element of the landing gear and the other bracket configured to be bolted to a brake plate of the landing gear.

The rigid member is preferably configured such that the bolt(s) extend through existing, factory-drilled holes in the landing gear. The brackets may be, for example, generally U-shaped.

The second portion may include a bracket configured to receive a second rigid member, which is in some cases pivotably attached to the first rigid member, e.g., by bolting the second rigid member to the first rigid member. In the case of skis, this attachment allows the ski to pivot with respect to the landing gear. Generally, the second rigid member is configured to be attached to the piece of landing equipment, e.g., by bolting.

The invention also features methods of attaching landing equipment, e.g., skis or pontoons, to the landing gear of an aircraft.

In one aspect, the invention features a method that includes removably attaching to the landing gear a rigid member having a first portion configured to be removably attached to the landing gear and a second portion configured to allow a piece of landing equipment to be removably mounted on the rigid member.

Some implementations include one or more of the following features.

Removably attaching the rigid member includes bolting the rigid member to the landing gear, e.g., through existing, factory drilled holes in the landing gear. The rigid member may include any one or more of the features described above. The method may further include drilling a hole in the bracket that is bolted to the brake plate prior to bolting the bracket to the brake plate, e.g., using the brake plate as a drill guide to position the holes.

DETAILED DESCRIPTION

The present disclosure relates generally to attachment brackets that are configured to be bolted onto the landing gear of an aircraft, using existing bolt holes in the landing gear, and allow landing equipment, such as skis or pontoons, to be removably attached to the landing gear. The attachment brackets are suitable for use with standard aircraft landing gear, for example Piper Cub style landing gear.

As will be discussed in detail below, the attachment brackets include component parts that are welded together creating a single part. The parts are configured to facilitate the attachment of the bracket to the landing gear. The shapes of the parts are also designed to interface with each other to reinforce the other parts of the bracket in high stress areas. In some implementations, the parts are welded in a welding jig that is built with the actual design and style of landing gear that the attachment bracket is designed to attach to.

Figure 1:
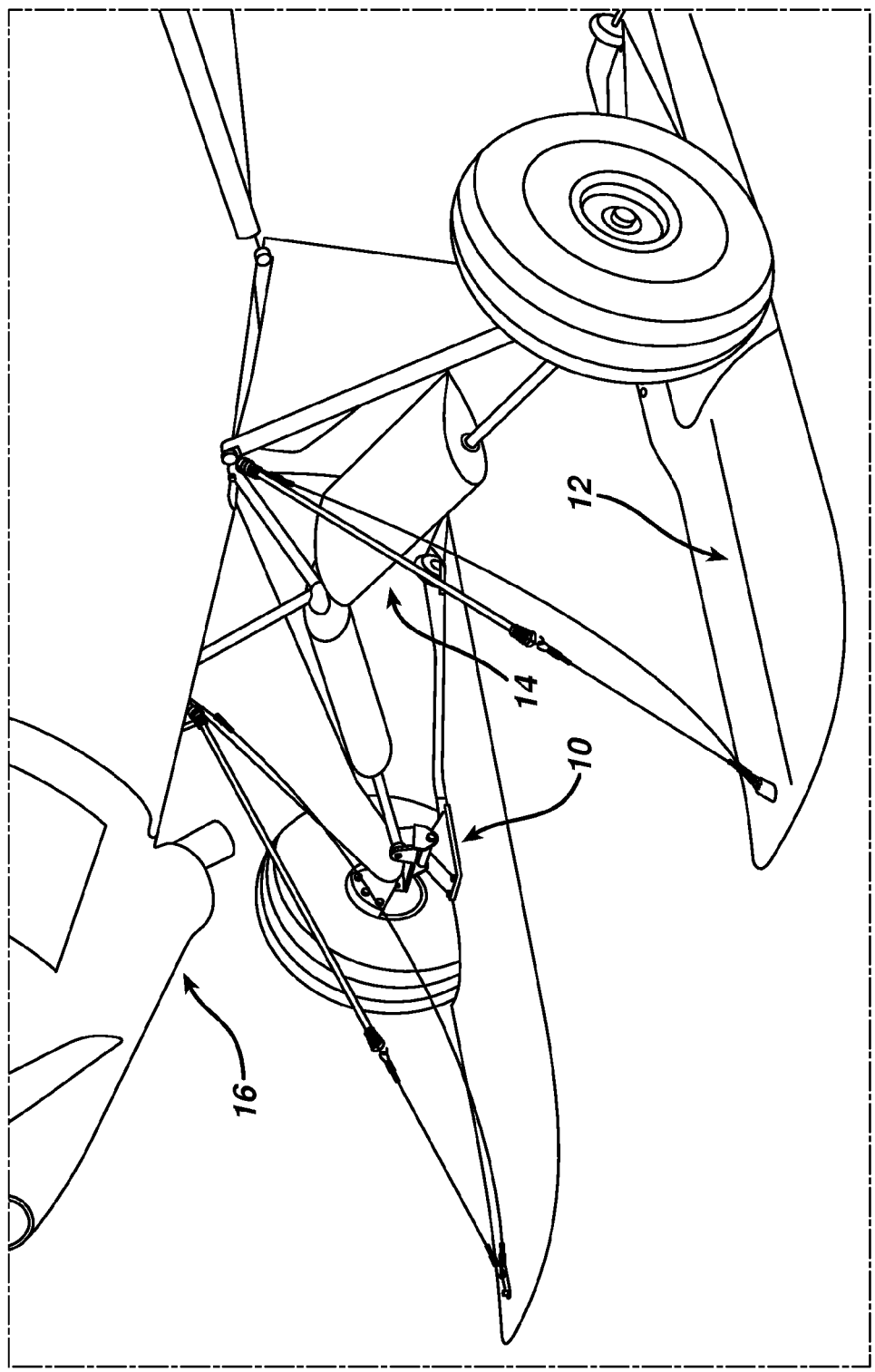
FIG. 1 is a perspective view of an attachment bracket according to one embodiment of the invention in place on an aircraft.

FIG. 1 shows a pair of attachment brackets 10 in use, each bracket attaching a ski 12 to the landing gear 14 of an aircraft 16.

Figure 2:
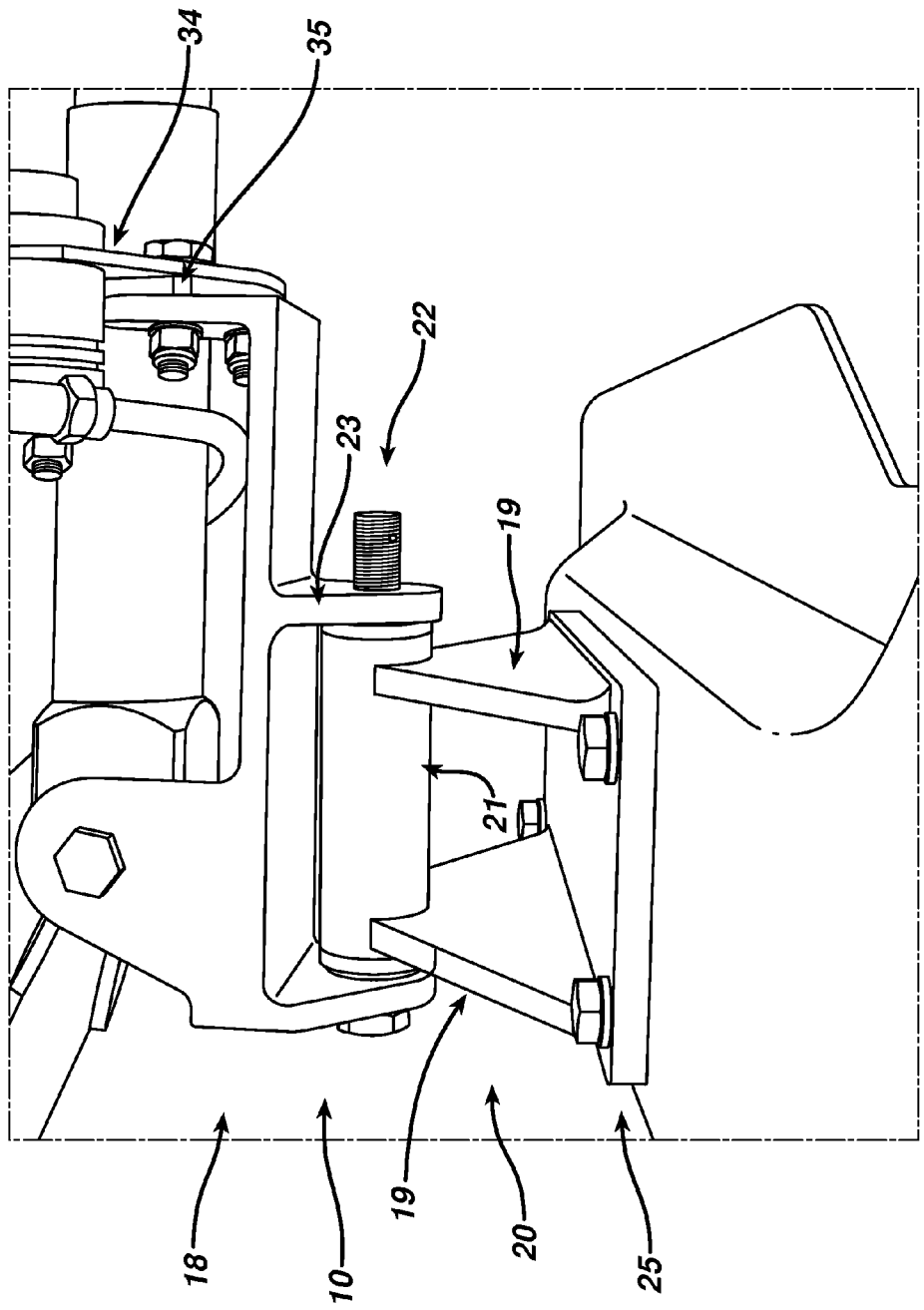
FIGS. 2 and 2A are enlarged views of the attachment bracket shown in FIG. 1.

Referring to FIG. 2, the bracket 10 includes an upper rigid member 18 and a lower rigid member 20, which are pivotably attached by a bolt 22 that extends through a bracket 23 extending from the lower surface of the rigid member 18. Bracket 23 is positioned to provide proper alignment between the landing equipment (ski 12) and the landing gear. The upper and lower rigid members may be made, for example, of chromoly steel or other high strength material. The lower rigid member 20 includes a rigid cylindrical member 21 for receiving the bolt, two generally parallel, spaced, vertical triangular members 19 welded to the cylindrical member, and a mounting plate 25 welded to the triangular members. The mounting plate 25 is configured to be bolted to a piece of landing equipment, e.g., as ski 12 as shown. The arrangement of the triangular members, mounting plate, and cylindrical member provides a high strength assembly designed to withstand landing forces.

Figure 2A:
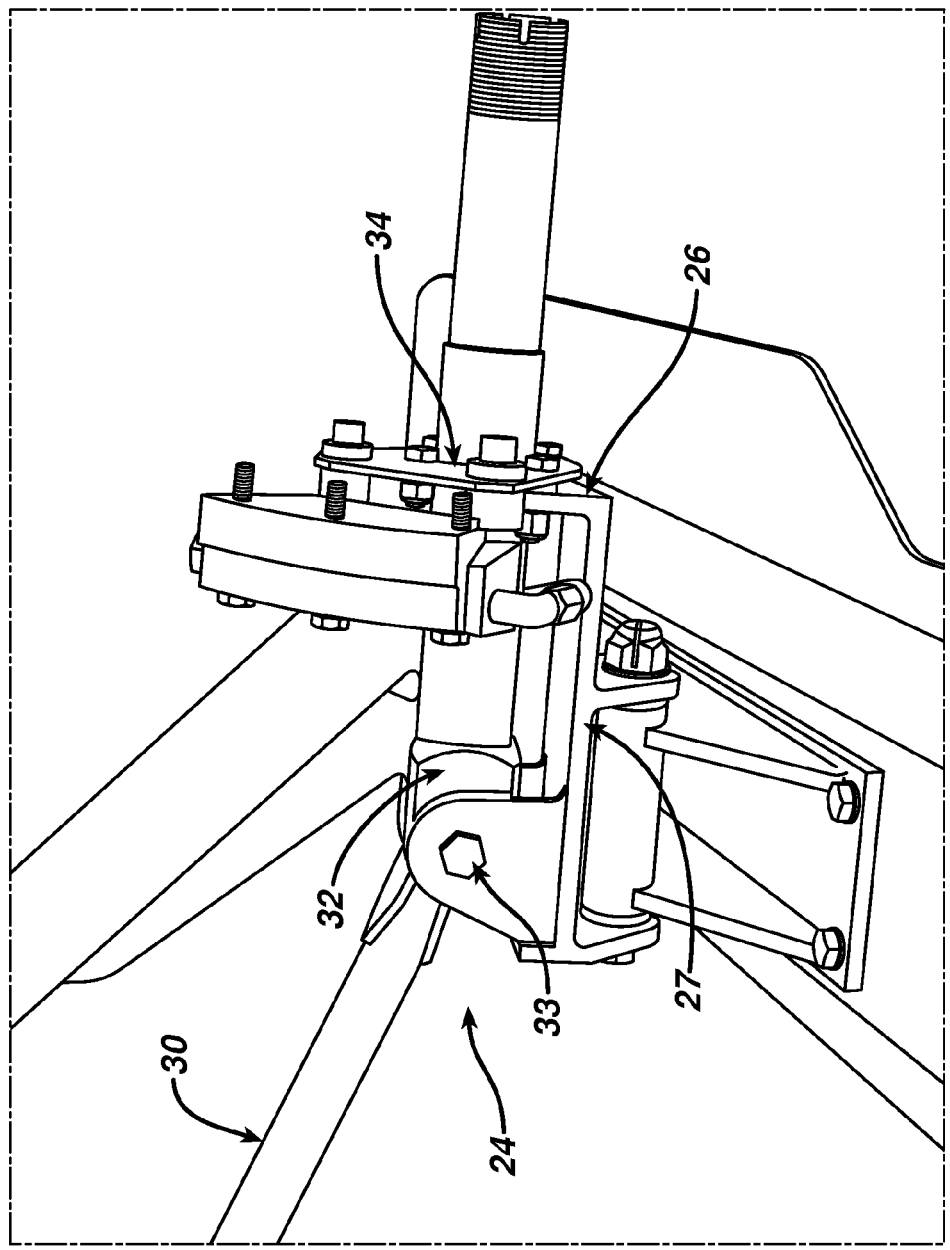

Referring now to FIG. 2A, the upper rigid member 18 includes a first bracket 24 and a second bracket 26 disposed at right angles to the first bracket. This arrangement provides the upper rigid member with high strength and helps to enable the upper rigid member to withstand the forces exerted on it during landing. In the implementation shown in the figures, the first and second brackets are welded to a support plate 27. Bracket 23 is also welded to plate 27.

Figure 3:
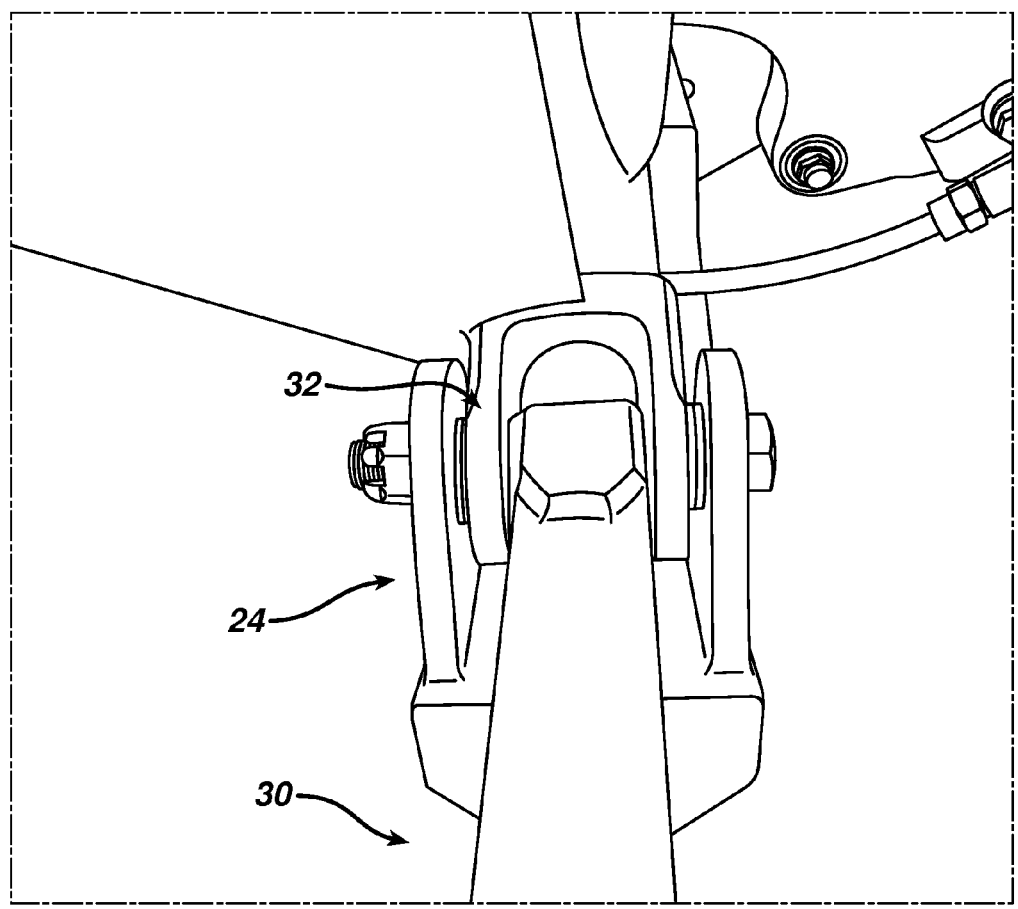
FIG. 3 is an enlarged detail view of the portion of the attachment bracket of FIG. 1 that utilizes the holes in the suspension and axle of the landing gear.

Bracket 24 fits around the area of the landing gear where the suspension strut 30 is bolted to the axle housing 32, and is held in place by a bolt 33 that extends through the factory drilled holes that are used for that purpose. The bolt 33 is slightly longer than the factory-supplied bolt, to accommodate the thickness of the bracket, but otherwise is similar to and functions in the same manner as the original bolt. This assembly is shown in further detail in FIG. 3.

Bracket 26 is positioned on one side (towards the centerline of the aircraft) of the area of the landing gear where the brake plate 34 is bolted to a plate 35 (best seen in FIG. 2) that holds the brake caliper of the landing gear. Like bracket 24, bracket 26 is bolted on using factory-drilled holes in the brake plate and brake caliper plate, with a bolt that is slightly longer than the factory-supplied bolt.

Figure 4:
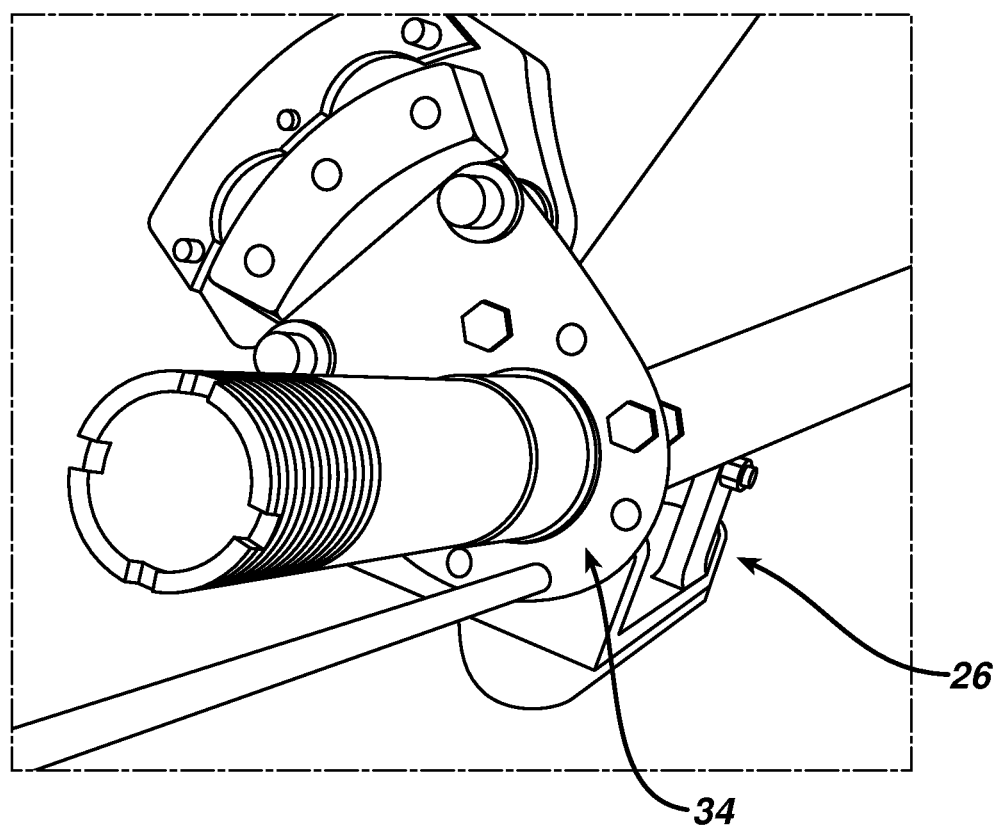
FIG. 4 is a perspective view showing holes being drilled in the portion of the attachment bracket that utilizes the holes in the brake plate, using the brake plate as a drill guide.

Referring to FIG. 4, the hole through which bracket 26 is bolted to the brake plate may in some cases be drilled by the installer, rather than the supplier of attachment bracket 10. To do this, the installer would remove the wheel from the axle, insert bolt 33 into the factory drilled holes in the brake plate 34 and plate 35 to position the bracket 26 in its proper alignment, and then use the brake plate as a drill guide to ensure that the hole is drilled in the correct position. Having the installer drill this hole allows the hole to be correctly positioned regardless of the hole pattern of the brake plate that is present in the landing gear, and accommodates the variation between such hole patterns.

Figure 5:
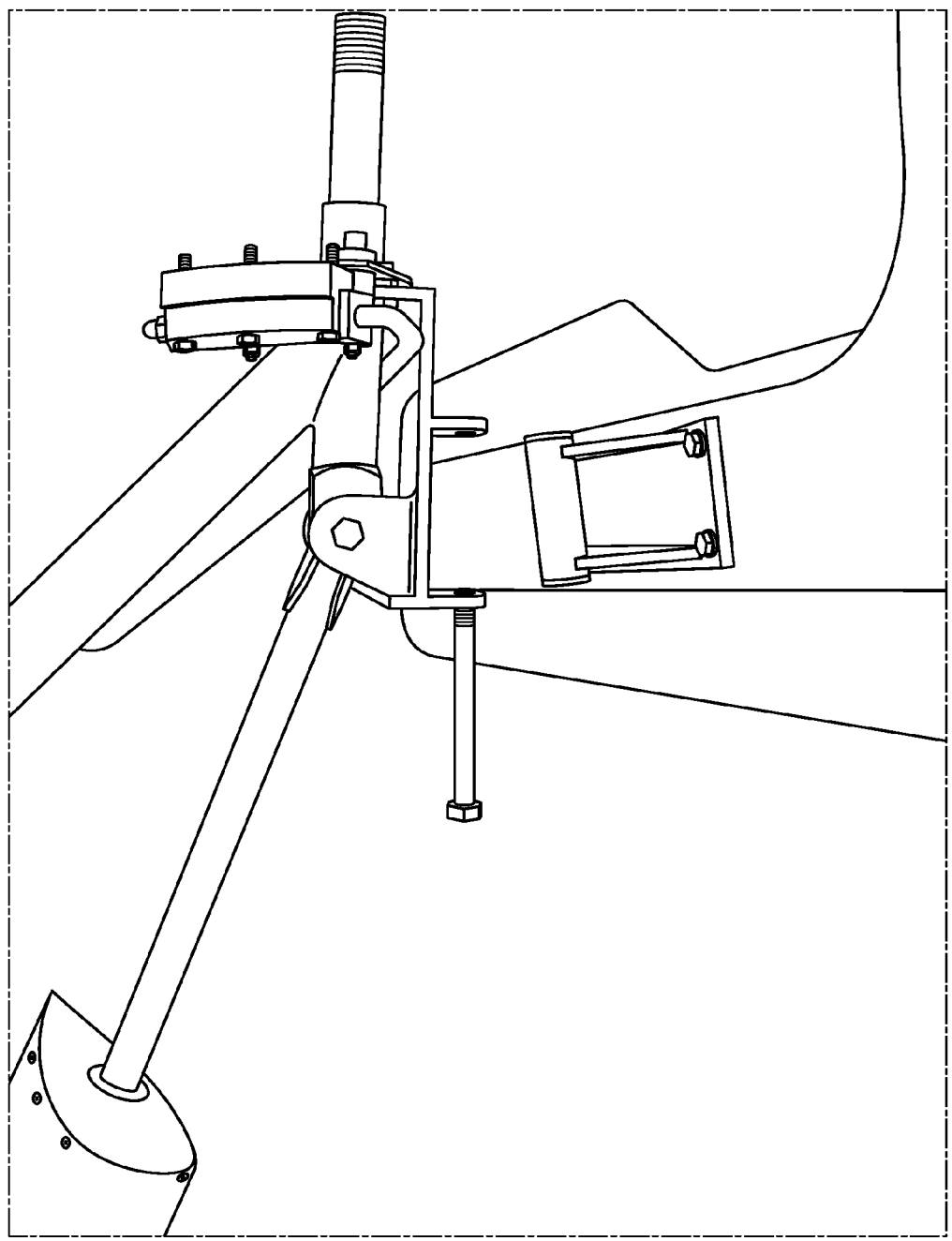
FIGS. 5 and 5A are perspective views showing the assembly of the first and second rigid members of the attachment bracket.
Figure 5A:
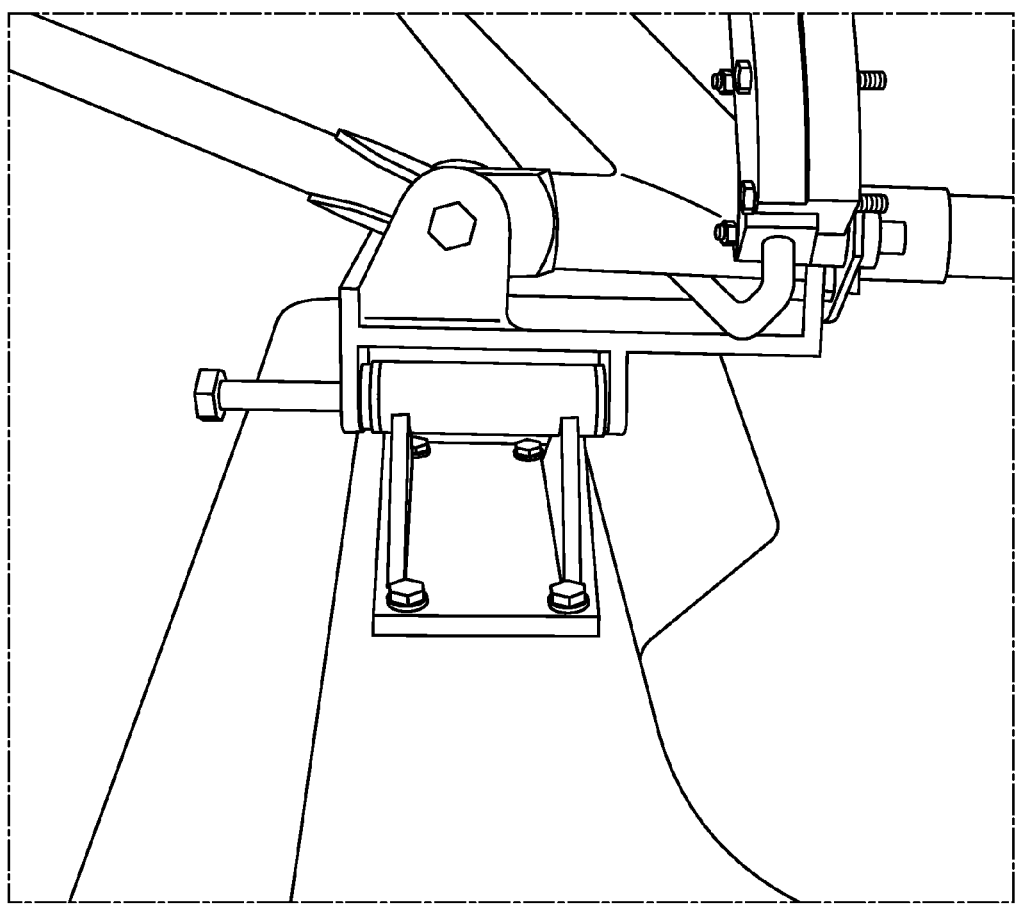

FIGS. 5 and 5A show the assembly of the upper and lower rigid members. As shown, it is generally preferred that the ski (or other landing equipment) be attached to the lower rigid member prior to assembly.

Other Embodiments

A number of embodiments have been described. Nevertheless, it will be understood that various modifications may be made without departing from the spirit and scope of the disclosure.

For example, while it is often preferred that the hole in bracket 26 be drilled by the installer, in some implementations it may be factory drilled, or a slot may be provided to accommodate differences in hole patterns.

Moreover, although generally the landing equipment is mounted when the upper and lower rigid members are assembled, as shown in FIGS. 5-5A, if desired the landing equipment can be attached after assembly.

Accordingly, other embodiments are within the scope of the following claims.

What is claimed is:

1. A device for attaching a piece of landing equipment to landing gear of an aircraft, the landing gear including a suspension strut that is bolted to an axle housing through factory drilled holes, the device comprising:
    a rigid member having (a) a first portion configured to be removably attached to the landing gear, and (b) a second portion configured to allow the piece of landing equipment to be removably mounted on the rigid member;
    wherein the first portion includes a bracket element constructed to be attached to the landing gear by a bolt that extends through the factory drilled holes, attaching the suspension strut to the axle housing, and also through corresponding holes in the bracket element.

2. The device of claim 1 wherein the first portion comprises at least one bracket element configured to be bolted to the landing gear.

3. The device of claim 2 wherein the first portion comprises a pair of bracket elements, disposed such that bolts extending through the bracket elements are generally perpendicular to each other.

4. The device of claim 2 wherein the rigid member is configured such that the bolt extends through existing holes in the landing gear.

5. The device of claim 2 wherein the bracket element is generally U-shaped.

6. The device of claim 1 wherein the second portion comprises a bracket configured to receive a second rigid member.

7. The device of claim 6 wherein the second rigid member is pivotably attached to the first rigid member.

8. The device of claim 7 wherein the second rigid member is bolted to the first rigid member.

9. The device of claim 6 wherein the second rigid member is configured to be attached to the piece of landing equipment.

10. The device of claim 9 wherein second rigid member is configured to be bolted to the second rigid member.

11. The device of claim 3 wherein one of the brackets is configured to be bolted to a suspension element of the landing gear and the other bracket is configured to be bolted to a brake plate of the landing gear.

12. A method of attaching a piece of landing equipment to landing gear of an aircraft, the landing gear including a suspension strut that is bolted to an axle housing through factory drilled holes, the device comprising:
    removably attaching to the landing gear a rigid member having (a) a first portion configured to be removably attached to the landing gear, and (b) a second portion configured to allow the piece of landing equipment to be removably mounted on the rigid member;
    wherein the first portion includes a bracket element constructed to be attached to the landing gear by a bolt that extends through the factory drilled holes, attaching the suspension strut to the axle housing, and also through corresponding holes in the bracket element.

13. The method of claim 12 wherein removably attaching the rigid member comprises bolting the rigid member to the landing gear.

14. The method of claim 13 wherein the rigid member is bolted to the landing gear through existing holes in the landing gear.

15. The method of claim 13 wherein the rigid member includes a pair of brackets, and one bracket is bolted to a suspension element of the landing gear and the other bracket is bolted to a brake plate of the landing gear.

16. The method of claim 15 further comprising drilling a hole in the bracket that is bolted to the brake plate prior to bolting the bracket to the brake plate.

\* \* \* \* \*